Figure 1:
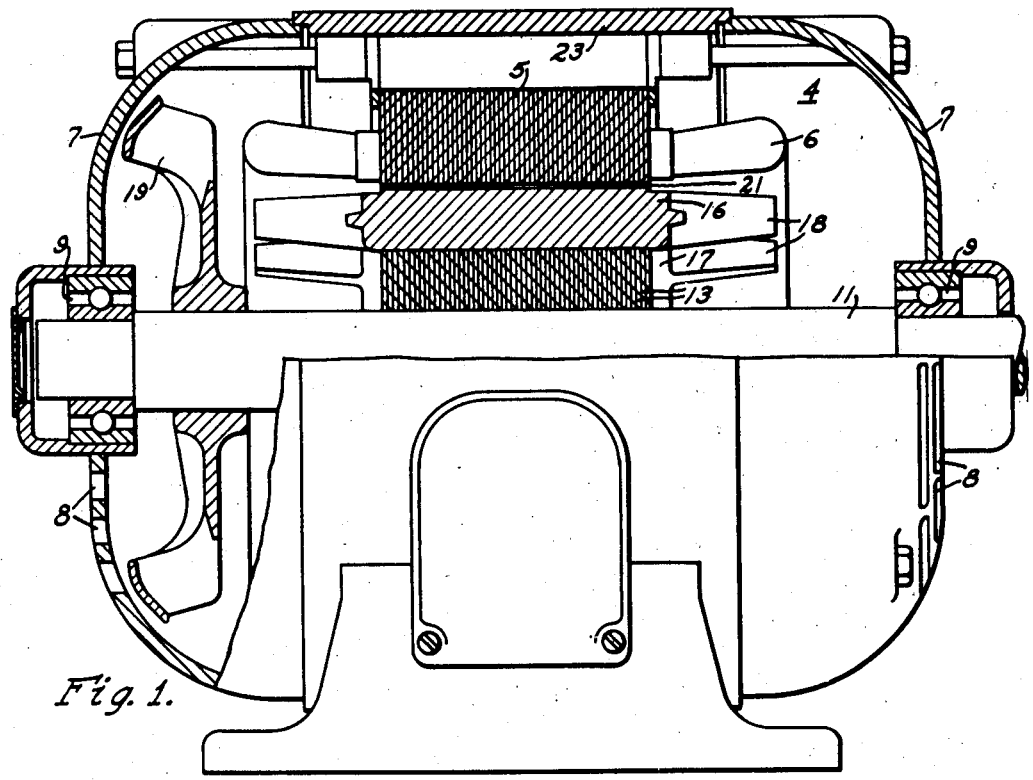

Jan. 4, 1949.    L. R. LUDWIG ET AL    2,458,011
DEEP-NECK HIGH-FLUX MOTOR
Filed Sept. 20, 1947

WITNESSES:

INVENTORS
Leon R. Ludwig and
William H. Formhals.
BY
ATTORNEY

Patented Jan. 4, 1949

2,458,011

UNITED STATES PATENT OFFICE 2,458,011

DEEP-NECK HIGH-FLUX MOTOR

Leon R. Ludwig and William H. Formhals, Buffalo, N. Y., assignors to Westinghouse Electric Corporation, East Pittsburgh, Pa., a corporation of Pennsylvania Application September 20, 1947, Serial No. 775,264

20 Claims. (Cl. 172—120)

Our invention relates to general-purpose squirrel-cage motors, as defined in the NEMA Motor and Generator Standards which are controlling for commercial motors in the United States. The NEMA definition of a general-purpose motor is any motor of 200 horsepower or less and 450 R. P. M. or more, having a continuous rating, and designed, listed or offered in standard ratings for use without restriction to a particular application.

Any general-purpose motor, as above defined, has to meet certain NEMA-defined standard requirements respecting full-load torque, pull-out torque, normal starting-torque and low starting-current, plus certain competitive standards respecting power-factor and efficiency. In general, motors are designed with an eye to meeting these minimum requirements, and no effort is made to design a motor which more than meets said requirements, particularly in the way of starting-torque, starting-current and pull-out torque, although any gain which can be obtained, in power-factor or efficiency, after meeting the necessary minimum requirements in other respects, is frequently taken into favorable consideration.

It is the general purpose of our invention to produce such a general-purpose motor with a new choice and correlation of design-constant emphasis, which will result in a motor having lighter weight, less material, and a lower manufacturing-cost.

The design of an induction motor involves long and tedious calculations, involving a very large number of constants which must be chosen by the design-engineer. In general, when any single one of the constants is changed, the entire calculation has to be performed over again, because practically nothing can be changed, without necessitating a change in some other constant. Thus, it is necessary to prevent the cure of an excessive starting-current, for instance, from reducing the torques below the established minimum limit which is accepted by the industry under the NEMA definitions, to give only an example. In fact, the conditions are so involved, that no theoretical designer, working from theoretical principles only, could ever come to any conclusion as to which are the best set of design-constants to use. Many design-shortcuts, based largely on empirical formulas, have been devised, but these are out of the question when an out-of-the-ordinary motor, such as ours, is to be designed. Many efforts at exact mathematical analyses, resulting in more or less exact equations and calculation-methods, involving great labor, have been devised, and some of them have been published, while others are the products of the ingenuity and perspicuity of the different designers, who develop their own private calculation-formulas and systems.

In general, our invention relates to commercial-frequency general-purpose motors. In the United States, this means 60 cycles primarily, with some motors being made for 25 cycles. We have not investigated the design of motors for higher-than-usual frequencies, such as 200 cycles or 400 cycles, and we make no claim to motors in these high-frequency ranges. In Europe, the standard frequency is 50 cycles, but the rigid NEMA requirements do not apply, so that the same design-limitations are not applicable. However, since the standard 60-cycle motor, as developed for use in the United States, is also applicable as a 50-cycle motor with only a possible occasional change in voltage-rating or other rating, we consider that our invention is applicable to 50-cycle motors, as being included in the range of ordinary commercial frequencies.

Our invention is primarily directed toward polyphase motors, which means, specifically, three-phase motors, for the most part, although we are not limited to the number of phases, in the broader aspects of our invention. But our invention is applicable also to single-phase motors, particularly since, to save costs, the designers of single-phase motors commonly use as many parts of the corresponding line of polyphase motors as possible, and this particularly applies to the primary laminations or punchings of the primary core. We consider that our invention is applicable to single-phase motors as well as polyphase motors.

Our invention was particularly designed for integral-horsepower motors, which are motors having a rating of one horsepower or more. It is obvious, however, that many features of our design are applicable to motors of less than one-horsepower rating. We consider, therefore, that our invention is not limited exclusively to the integral-horsepower ratings.

A general object of our invention is to devise a general-purpose squirrel-cage commercial-frequency motor which works the active material harder, and specifically one which uses a flux, or flux-densities, which are higher-than-average, for any particular rating. A higher flux or flux-density means fewer series primary turns, as the formula for the flux involves essentially the voltage divided by the primary series turns and the frequency, and other design-constant factors. But the flux or flux-density of an old general-purpose motor, which barely meets NEMA requirements, cannot be increased, without increasing the magnetizing-current of the motor, and this increased magnetizing-current would tend to reduce the power factor, which has already been assumed to be at or near its minimum acceptable value. One expedient which is immediately apparent to the designer, as a means for meeting the power-factor requirements, is to reduce the airgap, if he can perfect the mechanical features of his manufacturing processes to the point where motors having smaller-than-usual airgaps can be successfully manufactured, without the risk of rubbing at the airgap. But the airgap cannot be reduced without increasing the stray-load losses, which, in turn, result in a lowering of the efficiency, unless, of course, something else can be done about that.

In designing the machine, therefore, its power factor and its starting-current must be considered together. The requirement for properly limiting the starting-current indicates the need for having rather high leakage-reactance during the starting-operation. The more the saturation of the iron sections, the lower will be the reactance. If we were going to produce a successful high-flux design of general-purpose motor, we considered that it would be necessary to reduce the saturation of the iron sections by the leakage-flux which is set up, in turn, by the high starting-current.

There is an essential characteristic of the starting-reactance, which is not present in the calculation of the full-load running-reactance, and that is, the effect of saturation on the zig-zag reactance-factor, resulting from that part of the leakage-flux which threads in and out between the stator and rotor teeth and across the airgap. This zig-zag factor is a function of both the number of primary teeth and the number of secondary teeth. The zig-zag reactance-factor is thus affected by the harmonic components of the leakage-field, of the order of the number of stator-slots and the number of rotor-slots. This zig-zag reactance-factor constitutes a considerable portion of the total reactance under starting conditions.

There is not much that can be done with the other components of reactance, if other design-considerations fix the number of stator-slots, the number of rotor-slots, the airgap, the frequency, the square of the number of primary turns, the core-length, the airgap area, and other features; but the stator and rotor slot-factors can be changed, by changing the configuration of the stator and rotor teeth, particularly the portions of the teeth closest to the airgap. The width of the slot-openings, between teeth, has an effect upon the magnitude of the high-order harmonics of the order of the number of those teeth. In the case of the primary core, considerations of a reasonable ease of laying the primary winding dictate a certain minimum size of primary slot-opening. The depth of the tooth-necks, particularly the depth of the primary tooth-necks, or, more exactly, the ratio of neck-depth to slot-openings, determines, among other things, the slot-factor, or the effect of such a ratio on the zig-zag flux.

Heretofore, a deep-neck design has been commonly thought of, by some investigators, as involving higher stray-load losses, a greater change in reactance from running to starting conditions, and, in general, poorer performance of the motor. These thoughts have been based, however, on the idea of considering what would happen if an increase were made in the stator neck-depth, while holding the main flux constant. We have found that these thoughts are not true if the flux-density is increased at the same time that the neck-depth is increased. A high ratio of neck-depth to slot-opening, particularly in the stator or primary member, in combination with a high-flux design, is a means, therefore, for reducing the tendency for saturation to reduce the leakage-reactance of an induction motor under starting conditions, and in this way, we successfully limit the amount of the starting-current, notwithstanding the other things which we have done, which would otherwise have prohibitively increased the starting-current beyond the minimum limits established by NEMA.

In line with our general object of working the motor-materials harder, we have given considerable attention to the primary winding, and here again, the results have been cumulative, one thing leading to another, and that thing changing the first consideration, and so on in an endless circle. We started out with the thought of doing everything possible to dispense with waste space in the end-windings, so as to shorten the length of primary conductor which is involved in the end-windings or end-turns. And this thought was coupled with the other thought of using the smallest possible size of primary conductor which will carry the load-current with an acceptable temperature-rise. This has also necessitated another increase in the airgap flux-density, in order to maintain acceptable values of pull-out torque and starting-torque. But confining our attention to the primary conductors for the moment, the shortened end-turns meant a smaller primary copper-loss, which meant that a smaller primary copper wire could be used and still have the same amount of primary copper loss as before. This smaller wire, in turn, meant a smaller bundle of primary conductors, which meant smaller slots, and a still smaller amount of end-turn space, so that the end-turn length was still further reduced.

However, it is quite feasible to increase the primary copper-loss, over what it was previously, if, at the same time, the rotor "copper" loss is decreased, using the term "copper" for conductor-material, even though the rotor conductor-material is cast aluminum, instead of copper. And it is a part of our invention that we do just this. When the cost of winding is taken into consideration, as well as the cost of the materials themselves, the primary copper of an induction motor is relatively costly, whereas the secondary conductor-material, being cast, is relatively inexpensive. When the secondary "copper" losses are reduced, the secondary or rotor member runs at a lower temperature, and hence there is less tendency toward mechanical difficulties due to binding at the airgap because of temperature-rises in the rotor. The decision to accept an increase in the primary copper losses has again resulted in a still further reduction in the size of the primary wire, in the size of the primary bundles of wires, and in the length of the primary end-turns, because of the smaller end-turn space occupied by these bundles.

It will thus be seen, that when we start out to change one thing in a motor, we find that it cannot be done, unless something else is done to offset that, and something further to offset the second thing, and so on down the line, and in many cases we find that the changes are cumulative, the second factor affecting the first factor, and that again affecting the second factor, and so on in a circle which can finally be run down to its practical limits.

It must be understood, of course, that the foregoing considerations have been very sketchedly and incompletely outlined. There is much more to be said, for our design, than could possibly be said in the space which is available to us in a patent-application, both in the way of a consideration of many other factors which we have not even mentioned, and in the way of a more exact and painstaking consideration or explanation of the factors which we have mentioned. We have only attempted to mention some of the significant high-spots of our novel design.

Figure 2:
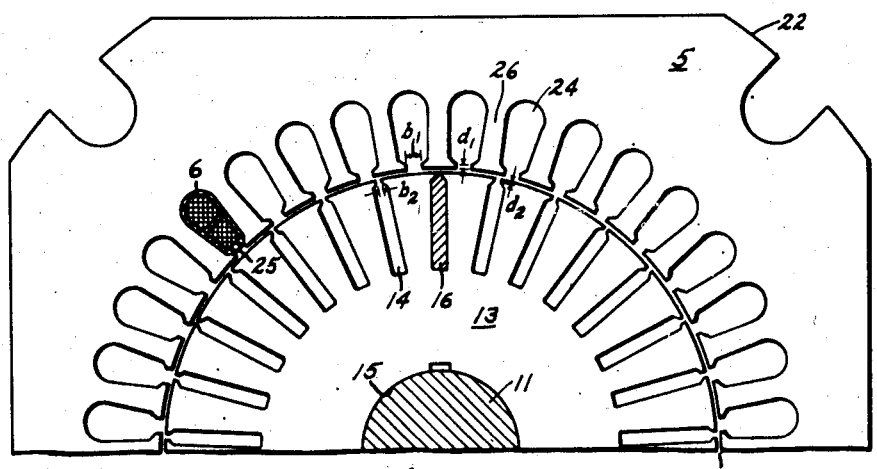

It is an object of our invention, therefore, to provide a novel design of commercial-frequency general-purpose squirrel-cage motor embodying some or all of the considerations which have been referred to hereinabove, and other considerations which will be pointed out in the following description and claims, and illustrated in the accompanying drawings, wherein:

Figure 1 is a side view of a motor embodying our invention, with parts in longitudinal section, and Fig. 2 is a partial transverse sectional view through the motor, showing the primary and secondary punchings.

We show our invention, by way of example, as being embodied in an open, protected motor having a primary or stator-member 4 having a stator-core 5 carrying a three-phase primary winding 6. The stator-member 4 carries two end brackets 7 having ventilating perforations 8 in their lower halves, and having centrally disposed bearings 9 for supporting the shaft 11 of the motor.

The motor-shaft 11 carries the secondary member or rotor-proper, which consists of a stack of magnetizable steel punchings or laminations 13, having peripheral winding-receiving slots 14 (Fig. 2) and a central shaft-receiving hole 15, and having a die-cast squirrel-cage winding-structure cast integrally therewith in a well-known manner. The cast winding-structure includes squirrel-cage bars 16 which occupy the slots 14, squirrel-cage end-rings 17, and a plurality of axially extending fan-blades 18, all cast integrally in a single die-casting operation, before the rotor-core 13 is placed on the shaft 11. In using the term "slots," in referring to the peripheral perforations in the punchings for receiving the squirrel-cage bars 16, we mean to include closed slots as well as partially open slots, or any other kind of slots, the usual practice being to utilize partially closed slots, as illustrated in Fig. 2.

The motor-shaft 11, in the illustrated form of embodiment of our invention, also carries a fan 19 (Fig. 1) which induces a flow of ventilating-air through the ventilating-openings 8 in the respective brackets 7.

Our invention has particular relation, among other things, to the stator-core 5, and to the conditions at the airgap 21 between the stator (or primary) and rotor (or secondary) cores 5 and 13. The stator-core 5 consists of a stack of magnetizable steel punchings or laminations 5, usually referred to as the stator or primary iron. In the illustrated form of embodiment of our invention, as shown in Fig. 2, the outer diameter of the stator-core 5 is not round, but square, with rounded corners 22, the rounded corners fitting within the stator frame 23. This is not an essential part of the present invention.

At the stator-bore, which bounds the airgap, there are provided a plurality of winding-receiving slots 24, for receiving the primary winding 6, as shown in Fig. 2. The coil-sides of the winding, which lie within the stator-slots 24, are retained in their slots by slot-wedges 25.

The configuration of the stator-slots 24, and of the stator-teeth 26, between the slots, is important, particularly at that part of the slot which is closest to the airgap, as this has a bearing on the stator slot-factor which enters into the design of our motor. The significant factors of the tooth and slot-configuration are the slot-opening, $b_1$, and the neck-depth, $d_1$ the subscript 1 referring to the primary punchings. The slot-opening, $b_1$, is the opening, of the partially open primary slot, through which the bundles of primary conductors are laid, in the process of laying the primary winding in the primary core. The "neck" at which the neck-depth $d_1$ is measured, is the portion of the stator-teeth 26 which bounds the slot-openings, next to the airgap.

The rotor-core 13 is also preferably provided with partially open slots, having a rotor slot-opening $b_2$, and a rotor neck-depth $d_2$, as shown in Fig. 2.

The following tabulation shows the design-constants for the exemplary 3-phase general-purpose 60-cycle motor which we have chosen for illustration in our drawings:

| | |
|---|---|
| Voltage | 220–440 |
| Horsepower rating, W | 7½ |
| Pole-number, N | 4 |
| $D^2L$ of iron (raw material) | 365 |
| Stator slots ÷ rotor slots | 36/29 |
| Stator neck-depth, $d_1$ | 0.5 |
| Stator slot-opening, $b_1$ | .135 |
| Stator ratio, neck-depth ÷ slot-opening | .37 |
| Rotor neck-depth, $d_2$ | .015 |
| Rotor slot-opening, $b_2$ | .05 |
| Rotor ratio, neck-depth ÷ slot-opening | .3 |
| Skew (in inches, based on rough rotor-diameter) | .56 |
| Finished rotor-diameter | 5.843 |
| Airgap | .0155 |
| Core-length | 4.5 |
| Stator outer-diameter, across flat sides | 9 |
| Stator outer-diameter, at round corners | 10.75 |
| Pounds of stator-copper | 8.5 |
| Primary turns per coil | 14 |
| Connection | Y |
| Throw | 1–8 |
| Airgap flux-density (assuming sinusoidal) | 43 |
| Stator tooth-density | 103 |
| Rotor tooth-density | 93 |
| Stator core-density | 79 |
| Rotor core-density | 67 |
| Efficiency, percent | 86.2 |
| Power factor, percent | 84.5 |
| Starting torque, in terms of full-load torque | 1.95 |
| Pull-out torque, in terms of full-load | 2.6 |
| Reactance $X_R$, running conditions | .144 |
| Reactance $X_S$, starting conditions | .117 |

Ratio $X_R/X_S$ ---------------------------- 1.23
Magnetizing current, $I_M$ ------------------ 3.58
Slip, percent ------------------------------ 2.66
Locked amperes (starting current) ---------- 60
Full-load amperes -------------------------- 10.1

In recapitulation of the operation of our invention, and of the effects of the various design-constants which are involved, the following items are to be noted.

Our new motor has an apparent airgap flux-density which is at least $(38 + 7/W^{0.8})$ and preferably at least $(39 + 6/W)$, expressed in kilolines per square inch, defining the apparent airgap flux-density as being the flux-density which would exist at the center of the pole if the flux of the pole had a sinusoidal space-distribution in the airgap. In these formulas, W expresses the rating of the motor in horsepower. This definition expresses the general state of the iron-saturation, and the number of serially connected primary turns, for any given primary voltage, because the total flux per pole is directly proportional to the voltage, and inversely proportional to the primary turns, the frequency, and various other factors, such as the primary chord-factor and the primary distribution-factor. The number of primary series conductors is, in turn, dependent upon the number of primary slots and the number of turns per coil, divided by the number of phases and the number of parallel paths in the primary winding. The average flux-density is the total flux per pole divided by the airgap area of the pole. If this average flux-density were supposed to have a sinusoidal space-distribution under the pole, then the apparent airgap flux-density which we use, in our formulas, is the maximum value of the fundamental field, or the flux-density which would exist in the center of the pole. This apparent airgap flux-density is 1.57 times the average value of the airgap density.

We are not claiming all motors having an apparent airgap flux-density within the range just stated. Special motors have been made, in the past, as in the case of hoist-motors and other motors which are not general-purpose motors, having extremely high flux-densities. The flux-densities which we have indicated are, however, higher than is common in general-purpose squirrel cage induction motors. Regardless of the specific novelty of the flux-density per se, however, our flux-density is to be considered as only one element of a number of design-constants which are to be taken into consideration, together, as defining an overall combination or organization of design-constants, which has resulted in a greatly improved motor, which is being put into use, in increasingly greater completeness, throughout a complete line of general-purpose induction-motors manufactured by the Westinghouse Electric Corporation.

The definition of our high-flux density also amounts, in effect, to the definition of a motor which has high tooth-flux saturation, in both the stator and rotor teeth, because the tooth-flux density is the quotient of the high flux carried by any one tooth, divided by the cross-sectional area of that tooth. The iron or magnetizable material of our motors saturates somewhere around 90 kilolines per square inch, and this saturation-value is exceeded in our stator and rotor teeth.

Our invention is particularly applicable, as previously stated, to integral-horsepower motors, involving horsepower ratings from one on up to 50 horsepower, or even higher, although our invention has its more important applications, in some respects, in the ratings from one to 15 or 20 horsepower, and even more particularly, in the ratings from 5 or 7½ horsepower up to 15 or 20 horsepower.

In our formulas expressive of the apparent air-gap flux-density, it is not usually requisite to consider these flux-densities to a closer value than the nearest integral number of kilolines per square inch. Thus, the formula $(38+7/W^{0.8})$ represents a flux-density of 45 kilolines at a horsepower $W=1$, 43 kilolines at 1½ horsepower, 42 kilolines at 2 horsepower, 41 kilolines at 3 horsepower, 40 kilolines at 5 horsepower, 39 kilolines at 10 horsepower, and 38 kilolines at 50 horsepower. The formula $(39+6/W)$ represents 45 kilolines at one horsepower, 43 kilolines at 1½ horsepower, 42 kilolines at 2 horsepower, 41 kilolines at 3 horsepower, 40 kilolines at 5 to 10 horsepower, and 39 kilolines thereafter.

It will be noted that our motor has partially open slots in the stator core, and preferably also partially open slots in the rotor core, although, in some ratings, the partially open rotor-slots are not as necessary, although they may still be desirable or advantageous. The effect of the slot-opening is to emphasize the zig-zag leakage, and the high-order space-distribution harmonics of the airgap flux. The primary slot-openings are also needed, in order to facilitate the laying-in of the primary winding, through these slot-openings.

It is an essential feature of our invention that the teeth of the primary core, and to a less important extent, the teeth of the rotor-core, shall have relatively deep necks, as compared to proportions which have been prevalent in previous designs. These neck-portions of the teeth are the portions which bound the slot-openings between successive teeth, and the neck-depth is measured at these slot-openings. In the drawings illustrative of our invention, these neck-openings have substantially parallel sides, so that the width of the slot-openings is substantially constant at all points up and down the length of the tooth-necks. This is particularly true of the primary teeth, where it is desirable to have no minimum-opening point, which would reduce the effective slot-opening so far as the laying of the primary winding is concerned. In any event, however, the tops and bottoms of the tooth-neck portions can be rounded at the corners, and in the case of the rotor-teeth in particular, the slot-openings do not need to have parallel sides, so that when we refer to the neck-depth and the slot-opening, we refer to the effective values of these quantities, which would be used in making magnetic flux calculations.

In accordance with our invention, there is a definite range of values which are suitable for the ratio of the effective depth of the necks of the teeth between the stator-slots, divided by the slot-opening of the stator-slots. This ratio must be higher than a certain minimum value, in order to be able to meet the starting-current and starting-torque requirements established by NEMA. Experience has shown that difficulties are involved if this ratio of neck-depth to slot-opening, in the stator-member should be too high, and hence there is a maximum limit to the range of values which can be assigned for this ratio, in accordance with our invention.

The minimum value of the ratio of the effective depth of the necks of the teeth between the stator-slots, divided by the slot-openings of the stator-slots, is substantially $$(0.15+0.6/N-0.8/N^2W)$$

where N is the number of poles, and W is the horsepower rating, and defining "substantially" as being considered to the nearest tenth, that is, within .05 of the figure given by the formula. The maximum value of this ratio is substantially as defined by the formula $$(0.31+2.3/N^2-0.2/NW)$$

As to the values of the pole-numbers N, our invention is primarily directed to four-pole motors, because the design-constants of these motors are such that our invention has its greatest effectiveness when applied thereto. The effectiveness of our invention is smaller, for two-pole and six-pole motors, than it is for four-pole motors, and our invention is of still smaller effectiveness or importance, when applied to eight-pole motors. It is believed that our invention might have some slight application in motors of still larger pole-numbers, and hence we do not wish to be limited altogether to a preferred pole-number or a preferred range of pole-numbers.

In the case of four-pole motors, the effective range of the ratio of stator neck-depth to slot-opening may be expressed as being not substantially less than 0.3 and not substantially more than $(0.45-0.05/W)$. In the case of two-pole motors, this ratio may be expressed as being not substantially less than $(0.45-0.10/W)$ and not substantially more than $(0.87-0.10/W)$.

The effect of the deep-neck design, in a motor which otherwise conforms to our specifications, is to produce a motor in which the leakage-reactance does not change very greatly, as compared to previous motors, between running conditions and starting conditions, thus enabling us to obtain a sufficiently high starting reactance to meet the NEMA requirements as to starting-current and starting-torque, while still having a sufficiently low running reactance to meet, or more than meet, the NEMA requirements as to power factor and torque.

For various reasons, a full discussion of which would unduly prolong the specification, it is desirable that the neck-depth be obtained mainly in the primary core, rather than the secondary core. It is nevertheless desirable, although not in all cases anything like obligatory, to have discrete slot-openings in the rotor-core, which will mean a certain ratio of neck-depth to slot-openings in the rotor-member. When the stator-member is provided with the above-described ratios of neck-depth to slot-openings, it is desirable that the ratio of the effective depth of the necks of the teeth between the rotor-slots, divided by the effective slot-opening of the rotor-slots shall be in a range bounded by a minimum value which is not substantially less than $$\frac{1}{10}(4.4-W^{0.3})$$

and a maximum value which is not substantially more than $$\frac{1}{10}(9.4-W^{0.3})$$

In effect, this means, that the said range is bounded by a minimum value which is approximately 0.3 for horsepowers between 1 and 7½, and approximately 0.2 for horsepowers of 10 or 15, and bounded by a maximum value which is approximately 0.7 for horsepowers between 1 and 3, approximately 0.6 for horsepowers of 5 or 7½, and approximately 0.5 for horsepowers of 10 or 15.

As previously indicated, we use not only fewer primary turns, but smaller primary wire, and shorter primary end-turns, and we accept a greater proportion of the total $I^2R$ losses of the motor in the primary winding, where the costs are high, than in the secondary "winding," which is cast so that its cost is low. These comparisons are made between our improved motor and the general-purpose motors of the prior art. If we were to attempt to define this phase of our invention, we would say that the weight of the primary copper, in pounds, is not substantially more than $$4.2+0.5W^{1.07}+0.11(W-1.5)(N^{\frac{1}{2}}-0.1N)+$$
$$0.1W^{\frac{1}{2}}[W-330{,}000(N+16)^{-4}]^{\frac{1}{2}}+0.1WN^2$$

defining "substantially" as to the nearest tenth of a pound, or within 0.05 pound. The weight of the primary copper, as defined in this formula, should not be substantially more than is shown in the following table. Certain more preferred maximums are also indicated in parentheses, representing 3-phase motors by $\phi=3$, and single-phase motors by $\phi=1$, although we are not limited to the ratings and phase-numbers indicated.

*Pounds of primary copper*

| W | N=2, φ=3 | N=4, φ=3 | N=4, φ=1 | N=6, φ=3 | N=8, φ=3 |
|---|---|---|---|---|---|
| 0.5 | | | | | |
| 0.75 | | | | | 4.9 (3.8) |
| 1 | | 4.7 (4.5) | 4.7 (5.5) | 4.8 (3.3) | 5.0 (4.1) |
| 1.5 | 4.8 (4.0) | 5.1 (4.4) | 5.1 (6) | 4.9 (3.6) | 5.2 (4.4) |
| 2 | 5.15 (6.2) | 5.7 (4.0) | 5.7 (5.4) | 5.5 (3.7) | 6.0 (6.8) |
| 3 | 6.1 (5.1) | 6.7 (5.5) | 6.7 (5.8) | 6.15 (5.5) | 6.8 (7.0) |
| 5 | 7.8 (7.0) | 8.5 (7.3) | | 7.3 (7.2) | 8.1 (8.3) |
| 7.5 | 9.85 (11.7) | 10.9 (8.9) | | 9.5 (8.8) | 10.9 (10.8) |
| 10 | 11.9 (11.9) | 13.2 (11.2) | | 12.4 (11.1) | 14.5 (13.2) |
| 15 | 16.0 (16.6) | 18.0 (15.0) | | 15.25 (15.3) | |
| 20 | 20.2 (17.6) | | | | |
| 50 | | 47.55 (47) | | | |

It has also been previously explained that our new motor performs at its best with an airgap which is shorter than has heretofore been common in general-purpose motors. If we were to attempt to define this phase of our invention, we would say that the airgap should not be substantially more than $$11.6[250N^{-4}+3.2\phi^{-1}+W+.002W^{0.6}(N-5.9)^{-3}+$$
$$.002W^{0.8}(N-7.9)^{-3}]^{\frac{1}{2}}+.02WN+60W^2(N-$$
$$1.9)^{-3}+.002(W-4)^{-2}(N-5.9)^{-3}+$$
$$.002(W-2.25)^{-2}(N-7.9)^{-3}$$

defining "substantially" as being to the nearest mil or thousandth of an inch, φ being the number of phases, $\phi=1$ representing a single-phase motor. The airgap, as defined by this formula, should not be substantially more than is shown in the following table; certain more preferred maximums being indicated in parentheses:

Airgap in mils

| W | N=2, φ=3 | N=4, φ=3 | N=4, φ=1 | N=6, φ=3 | N=8, φ=3 |
|---|---|---|---|---|---|
| 0.5 | | | | | 14.7 (11) |
| 0.75 | | | | 14.3 (11) | 15.3 (11) |
| 1 | | 14.2 (11) | 15.5 (13) | 15.0 (11) | 16.3 (12) |
| 1.5 | 19.0 (19) | 14.5 (11) | 16.1 (13) | 16.0 (12) | 19.5 (19.5) |
| 2 | 19.3 (19) | 14.9 (12) | 16.4 (15) | 16.8 (12) | 19.7 (19.5) |
| 3 | 19.8 (20) | 15.7 (12) | 17.0 (15) | 19.2 (19.5) | 21.3 (19.5) |
| 5 | 21.3 (20) | 16.9 (16) | | 20.6 (19.5) | 19.8 (20) |
| 7.5 | 23.7 (23) | 18.1 (16) | | 20.3 (20) | 21.3 (20) |
| 10 | 26.8 (23) | 19.2 (18) | | 21.4 (20) | |
| 15 | 35.3 (40) | 21.0 (18) | | | |
| 20 | 46.75 (40) | | | | |
| 50 | | 30.4 (28) | | | |

When the pole-number is four, the airgap should preferably not be substantially more than $(8+3W^{1/2})$ mils, defining "substantially" as within 1 mil.

In our four-pole polyphase motors, these airgap-values approximate .013 for one and 1½ horsepower motors, .0135 for 2 to 5 horsepower motors, .016 for 7½ horsepower motors, .018 for 10 and 15 horsepower motors, and .025 for 50 horsepower motors. It is preferable that the airgap should not exceed these maximum values, although some of the advantages of our invention may be enjoyed without adhering to these airgap values.

We have illustrated our invention, and particularly described it, with reference to a polyphase motor. Since a general-purpose single-phase motor is, in some respects, a two-phase motor, many features of our invention are applicable to these motors, even though the design-problems of single-phase motors are in a class somewhat apart and by themselves. The importance of the features of our invention, respecting the stator slot-constant, the high flux, and the small airgap, are particularly applicable to single-phase motors, the more so because it is highly desirable, from the standpoint of economy in manufacture, to use poly-phase-motor parts, particularly the polyphase-motor stator-punchings, so far as may be possible, in single-phase designs.

There are a number of motor-design factors to which we have given little or no attention, in the preceding discussion of our motor. Thus, the skewing of the rotor-slots is a desirable feature, having a known effect in reducing the deleterious effects of the zig-zag reactance, and the choice of a suitable primary-winding chording or winding-pitch, to a value approximating 83%, or a 5–6th throw, or any other chording or pitch which tends to cancel out the low-order harmonics, namely the 5th and the 7th, which are primarily effective in reducing the motor-torques, or, in general, the motor performance between the pull-out speed and one or two hundred revolutions per minute.

It is also known, in previous motor-designing, that the ratio of the number of stator-slots to the number of rotor-slots should approximate either .8 or 1.2, or some other suitable value other than unity. It is desirable, from considerations of economy in the cost of manual labor for laying the primary windings, to use as small a number of primary slots as is possible, thus choosing a 36-slot primary, in preference to a 48-slot primary, and sometimes even going to a 24-slot primary.

In general, our motors will have a slip of less than 5%.

While we have described our invention in but a single illustrative form of embodiment, and while we have explained its principles and its limits to the best of our present ability, we wish it to be understood that the various features and combinations of our invention are necessarily not restricted to any particular precise design or construction, other than is indicated by the appended claims, when given the broadest construction consistent with their language.

We claim as our invention:

1. A general-purpose, commercial-frequency, N-pole, squirrel-cage motor having normal starting-current, normal starting-torque, normal efficiency, and normal power-factor, comprising a stator-core having partially open slots carrying a primary winding, and a rotor-core having partially open slots and having a cast squirrel-cage winding, characterized by the ratio of the effective depth of the necks of the teeth between the stator-slots, divided by the slot-opening of the stator-slots being in a range bounded by a minimum value which is not substantially less than $(0.15 + 0.6/N - 0.8/N^3W)$, and a maximum value which is not substantially more than $(0.31 + 2.3/N^2 - 0.2/NW)$, where W is the horsepower rating of the motor, and the apparent airgap flux-density being at least substantially $(38 + 7W^{0.8})$ kilolines per square inch, said apparent airgap flux-density being the flux-density which would exist at the center of the pole if the flux of the pole had a sinusoidal space-distribution in the airgap.

2. The invention as defined in claim 1, characterized by said apparent airgap flux-density being at least substantially $(39 + 6W)$ kilolines per square inch.

3. The invention as defined in claim 1, characterized by the pole-number N being one of the numbers 2, 4, 6, or 8.

4. The invention as defined in claim 1, characterized by the pole-number N being one of the numbers 6 or 8, and the ratio of the effective depth of the necks of the teeth between the stator-slots, divided by the slot-opening of the stator-slots, being in a range bounded by a minimum value which is not substantially less than 0.25 and a maximum value which is not substantially more than 0.35.

5. A general-purpose, commercial-frequency, four-pole, squirrel-cage motor having normal starting-current, normal starting-torque, normal efficiency, and normal power-factor, comprising a stator-core having partially open slots carrying a primary winding, and a rotor-core having partially open slots and having a cast squirrel-cage winding, characterized by the ratio of the effective depth of the necks of the teeth between the stator-slots, divided by the slot-opening of the stator-slots, being in a range bounded by a minimum value which is not substantially less than 0.3 and a maximum value which is not substantially more than $(0.45 - 0.05/W)$, where W is the horsepower rating of the motor, and the apparent airgap flux-density being at least substantially $(39 + 6/W)$ kilolines per square inch, said apparent airgap flux-density being the flux-density which would exist at the center of the pole if the flux of the pole had a sinusoidal space-distribution in the airgap.

6. A general-purpose, commercial-frequency, two-pole, squirrel-cage motor having normal starting-current, normal starting-torque, normal efficiency, and normal power-factor, comprising a stator-core having partially open slots carrying a primary winding, and a rotor-core having partially open slots and having a cast squirrel-cage winding, characterized by the ratio of the effective depth of the necks of the teeth between the stator-slots, divided by the slot-opening of the stator-slots, being in a range bounded by a minimum value which is not substantially less than $(0.45-0.10/W)$, and a maximum value which is not substantially more than $(0.87-0.10/W)$, where W is the horsepower rating of the motor, and the apparent airgap flux-density being at least substantially $(39+6/W)$ kilolines per square inch, said apparent airgap flux-density being the flux-density which would exist at the center of the pole if the flux of the pole had a sinusoidal space-distribution in the airgap.

7. The invention as defined in claim 1, characterized by the ratio of the effective depth of the necks of the teeth between the rotor-slots, divided by the effective slot-opening of the rotor-slots, being in a range bounded by a minimum value which is not substantially less than $$\frac{1}{10}(4.4-W^{0.3})$$

and a maximum value which is not substantially more than $$\frac{1}{10}(9.4-2W^{0.3})$$

8. The invention as defined in claim 1, characterized by the ratio of the effective depth of the necks of the teeth between the rotor-slots, divided by the effective slot-opening of the rotor-slots, being in a range bounded by a minimum value which is approximately 0.3 for horsepowers between 1 and 7½, and approximately 0.2 for horsepowers of 10 or 15, and bounded by a maximum value which is approximately 0.7 for horsepowers between 1 and 3, approximately 0.6 for horsepowers of 5 or 7½, and approximately 0.5 for horsepowers of 10 or 15.

9. The invention as defined in claim 5, characterized by the ratio of the effective depth of the necks of the teeth between the rotor-slots, divided by the effective slot-opening of the rotor-slots, being in a range bounded by a minimum value which is not substantially less than $$\frac{1}{10}(4.4-W^{0.3})$$

and a maximum value which is not substantially more than $$\frac{1}{10}(9.4-2W^{0.3})$$

10. The invention as defined in claim 5, characterized by the ratio of the effective depth of the necks of the teeth between the rotor-slots, divided by the effective slot-opening of the rotor-slots, being in a range bounded by a minimum value which is approximately 0.3 for horsepowers between 1 and 7½, and approximately 0.2 for horsepowers of 10 or 15, and bounded by a maximum value which is approximately 0.7 for horsepowers between 1 and 3, approximately 0.6 for horsepowers of 5 or 7½, and approximately 0.5 for horsepowers of 10 or 15.

11. The invention as defined in claim 1, characterized by the weight of the primary copper being not substantially more than $$4.2+0.5W^{1.07}+0.11(W-1.5)(N^{1/3}-0.1N)+0.1W^{1/3}[W-330,000(N+16)^{-4}]^{1/3}+0.1WN^2$$

defining "substantially" as within 0.05 pound.

12. The invention as defined in claim 1, characterized by the airgap being not substantially more than $$11.6[250N^{-4}+3.2\phi^{-1}+W+.002W^{0.6}(N-5.9)^{-3}+.002W^{0.8}(N-7.9)^{-3}]^{1/6}+.02WN+60W^2(N-1.9)^{-3}+.002(W-4)^{-2}(N-5.9)^{-3}+.002(W-2.25)^{-2}(N-7.9)^{-3}$$

defining "substantially" as being to the nearest mil, $\phi$ being the number of phases.

13. The invention as defined in claim 5, characterized by the airgap being not substantially more than $(8+3W^{1/2})$ mils, defining "substantially" as within 1 mil.

14. A polyphase motor as defined in claim 1.

15. A polyphase integral-horsepower motor as defined in claim 5, and having less than 5% slip.

16. A polyphase motor as defined in claim 5, characterized by the horsepower W being in the range from 5 to 15.

17. A polyphase, integral-horsepower, general-purpose, commercial-frequency, four-pole, squirrel-cage motor having normal starting-current, normal starting-torque, normal efficiency, normal low starting-current, and less than 5% slip, comprising a stator-core having partially open slots carrying a primary winding, and a rotor-core having a cast squirrel-cage winding, characterized by the ratio of the effective depth of the necks of the teeth between the stator-slots, divided by the slot-opening of the stator-slots, being in a range bounded by a minimum value which is not substantially less than 0.3 and a maximum value which is not substantially more than $(0.45-0.05/W)$, where W is the horsepower rating of the motor, and the apparent airgap flux-density being at least substantially $(39+6/W)$ kilolines per square inch, said apparent airgap flux-density being the flux-density which would exist at the center of the pole if the flux of the pole had a sinusoidal space-distribution in the airgap.

18. The invention as defined in claim 17, characterized by the weight of the primary copper being less than $$4.2+0.5W^{1.07}+0.11(W-1.5)(N^{1/3}-0.1N)+0.1W^{1/3}[W-330,000(N+16)^{-4}]^{1/3}+0.1WN^2$$

defining "substantially" as within 0.05 pound, N being 4.

19. The invention as defined in claim 17, characterized by the airgap being not substantially more than $(8+3W^{1/2})$ mils, defining "substantially" as within 1 mil.

20. The invention as defined in claim 17, characterized by the airgap being not substantially more than $(8+3W^{1/2})$ mils, defining "substantially" as within 1 mil, and further characterized by the horsepower W being in the range from 5 to 15.

LEON R. LUDWIG.
WILLIAM H. FORMHALS.

No references cited.

Certificate of Correction

Patent No. 2,458,011 January 4, 1949

LEON R. LUDWIG ET AL.

It is hereby certified that errors appear in the printed specification of the above numbered patent requiring correction as follows:

Column 2, line 47, for "cansider" read *consider*; column 6, line 48, for the numeral "0.5" read *.05*; line 51, for "d²" read $d_2$; line 52, for "b²" read $b_2$; column 10, line 9, for the formula $$\text{``}\frac{1}{10}(9.4 - W^{0.3})\text{''} \qquad \text{read} \qquad \frac{1}{10}(9.4 - 2W^{0.3})$$

column 11, line 44, for "poly-phase-motor" read *polyphase-motor*; column 12, line 43, for that portion of the formula reading "$7W^{0.8}$" read $7/W^{0.8}$;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*